United States Patent [19]

Crossley et al.

[11] 3,882,210

[45] May 6, 1975

[54] INJECTION OF A CERAMIC INTO A MOULD

[75] Inventors: Ian Alexander Crossley, Little Staughton; Geoffrey Eric Kirk, Gotham; Norman Howell Anthony, Spondon; Derek Robert Bamber, Castle Donington, all of England

[73] Assignees: Rolls-Royce Limited, London; The University of Technology, Leicestershire, both of England

[22] Filed: Nov. 17, 1972

[21] Appl. No.: 307,525

[30] Foreign Application Priority Data

Nov. 19, 1971 United Kingdom............... 53786/71

[52] U.S. Cl. .................. 264/63; 264/65; 264/328; 264/329
[51] Int. Cl. ............................................ B29c 25/00
[58] Field of Search ................ 264/65, 63, 328, 329

[56] References Cited
UNITED STATES PATENTS

| 2,356,081 | 8/1944 | Novotny | 264/329 |
| 2,593,507 | 4/1952 | Wainer | 264/63 X |
| 2,847,712 | 8/1958 | Pollard | 264/328 X |
| 2,938,807 | 5/1960 | Andersen | 264/63 |
| 3,495,939 | 2/1970 | Forrest | 264/65 X |

*Primary Examiner*—Richard R. Kucia
*Attorney, Agent, or Firm*—Cushman, Darby & Cushman

[57] ABSTRACT

A method of producing an injection moulded silicon carbide article comprises charging a chamber with a mix of alpha silicon carbide, graphite and a binder thereof, injecting the mix from the chamber into a mould, removing the mix from the mould, reheating the moulded mix so as to remove the binder and finally heating the finished moulded mix in a vacuum or inert atmosphere in the presence of molten silicon so as to absorb the silicon which reacts with the graphite to form beta silicon carbide and so obtain final densification of the finished moulded article.

5 Claims, No Drawings

INJECTION OF A CERAMIC INTO A MOULD

This invention concerns articles made by injection of a ceramic into a mould.

Silicon carbide has many properties, such as high resistance to thermal stress and thermal shock, resistance to corrosion in high temperature oxidising environments and high wear resistance, which make it suitable for use in the manufacture of components for devices such as gas turbine engines.

It is well known to manufacture components from silicon carbide by cold-compacting grains thereof in a suitably shaped mould, and then heating the assembly to such a temperature that the grains are sintered together. It is also known to manufacture components from silicon carbide by the heating, in the presence of molten silicon, of an extruded mixture of alpha silicon carbide, graphite and a binder therefor (TRG Report 2053 (S) "The Fabrication and Properties of Self-Bonded Silicon Carbide Bodies" published June 1970 by The United Kingdom Atomic Energy Authority, The Reactor Group, Risley, Warrington, Lancs., Great Britain.)

In the case of silicon carbide components manufactured by the sintering of cold-compacted particles of silicon carbide the resultant structure is liable to density gradients in the direction of compaction, with consequent loss of strength, and is limited to relatively simple shapes. Components produced from the alpha silicon carbide/graphite/binder mixture have excellent strength properties, but the shapes thereof are limited to those which can be produced by extrusion. The basic objective of the present invention is to provide a method of injection moulding a mixture of alpha silicon carbide, graphite and a binder thereof.

This objective is achieved according to the invention by the steps of charging a chamber with the alpha silicon carbide/graphite/binder mix, attaching the chamber to a mould member, heating the assembly, forcing the mix through a nozzle in the chamber so as to firstly compact the mix and secondly inject it into said mould member, increasing said force so as to further compact the mix whilst in the mould member, then removing said force, separating the chamber from the mould member and then the mix from the mould member.

An embodiment of the invention will now be described, by way of example, as follows.

A chamber having a loading feature and an extrusion nozzle is first loaded with a charge comprising:

53.9% alpha silicon carbide (particle size not more than - 400 mesh)
26% colloidal graphite
20.1% binder (comprising 7.6% poly n-butyl methacrylate, 9.75% di n-butyl phthalate, 2.5% expoxide resin, 0.25% dicyandiamide)

The chamber is charged to a pressure of about 3 tons per square inch so as to densify the mix and on completion of this operation, the chamber is affixed to a mould provided with air vents and having an enclosed shape from which it is desired to reproduce a male replica thereof. The chamber and mould interiors are in communication with each other via the chamber extrusion nozzle.

After connection of the chamber and mould, the entire assembly is heated to a temperature which gives the mix good flow characteristics. We have found that a temperature of about 105°C is sufficient for this purpose. The pressure within the chamber is then increased to a value which is sufficient to extrude the mix from the chamber and inject it into the interior of the mould. We have discovered that a pressure within the range 5 to 9 tons per square inch and ideally 6 tons per square inch, is sufficient for this purpose. On completion of the filling of the mould, the pressure is again increased to a value within the range 11 to 14 tons per square inch, and ideally 12 tons per square inch, and maintained thereat for about 15 seconds. Thus two further acts of densification of the mix are achieved, by extrusion and compaction.

Whilst the mould is still hot, the assembly is separated, the mould is split and the injection moulded mix removed. The mix has the male shape of the mould interior and is self supporting by virtue of the binder content and the densification which has taken place.

The moulded mix is now placed in an induction furnace and heated to a temperature of about 370°C in air so as to burn off the binder, thus leaving a porous article of alpha silicon carbide and graphite.

At this stage, further densification of the article so formed is required. This is achieved by placing the article in a vacuum or inert atmosphere in the presence of a source of elemental silicon, induction heating the article and the silicon to a temperature of about 1400°C so as to melt the silicon, whereupon the silicon penetrates the article by capillary action through the pores left by the removed binder. The molten silicon reacts exothermically with the graphite to form beta silicon carbide which precipitates on the alpha silicon carbide grains, thereby forming a bond therebetween. The alpha silicon carbide and beta silicon carbide are thus reaction sintered together. The pores remaining after the reaction sintering process is over are subsequently filled with the remaining molten silicon. Thus there is obtained a ceramic article the content of which comprises a high percentage of beta silicon carbide, a lower percentage of alpha silicon carbide and a still lower percentage of silicon, which has been shaped by injection moulding.

A ceramic such as that described herein has great resistance to destruction when subjected to high temperatures and is thus useful in the gas turbine engine filed. Moreover, the ability to form articles from such a ceramic by injection moulding makes possible the production of such intricate shapes as nozzle guide vanes and the like at a greatly reduced cost. For example one estimation indicates a reduction of 500% in cost when producing nozzle guide vanes by the method described herein, rather than by conventional casting and machining methods.

We claim:

1. A method of producing an article from a mixture of alpha silicon carbide, graphite and a binder thereof, including the steps of charging a chamber with the mix, attaching the chamber to a mould member, heating the assembly, forcing the mix through a nozzle in the chamber so as to firstly compact the mix and secondly inject it into said mould member, increasing said force so as to further compact the mix whilst in the mould member, then removing said force, separating the chamber from the mould member and then the mix from the mould member.

2. A method of producing an article as claimed in claim 1 wherein said mix is removed from the mould member whilst induced heat is still present.

3. A method of producing an article as claimed in claim 1 wherein said moulded mix is re-heated so as to remove the binder.

4. A method of producing an article as claimed in claim 3 wherein said moulded mix is heated for a third time in a vacuum or inert atmosphere in the presence of molten silicon so as to absorb the silicon which reacts with the graphite to form beta silicon carbide and so obtain final densification of the finished moulded article.

5. A method of producing an injection molded article composed of silicon carbide, comprising the steps of:
   a. mixing together alpha silicon carbide, graphite and a binder therefor to form a mix;
   b. charging the thus prepared mix under pressure into a chamber to densify the mix, the chamber fitted to a mold part which together constitute a molding assembly;
   c. heating the entire assembly thereby improving the flow characteristics of the mix contained within the chamber;
   d. increasing the pressure on the mix within the chamber and forcing the mix through a nozzle in the chamber to (i) further compact the mix, and (ii) inject the mix into the mold part;
   e. further increasing the pressure on the mix in the mold part to further compact the mix therein;
   f. discontinuing the applied pressure;
   g. separating the chamber from the mold piece;
   h. separating the mold piece while still heated and removing the injector molded mix;
   i. heating the injection molded mix to remove the binder;
   j. heating the injection molded mix of step (i) in a vacuum or an inert atmosphere in the presence of molten silicon which reacts exothermically with the graphite to form beta silicon grains; and
   k. reaction sintering together the alpha silicon carbide and beta silicon carbide to produce an injection molded ceramic article composed of beta silicon carbide, alpha silicon carbide and silicon.

* * * * *